US007907303B2

(12) United States Patent
Johnston

(10) Patent No.: US 7,907,303 B2
(45) Date of Patent: *Mar. 15, 2011

(54) SYSTEMS AND METHODS FOR PROCESSING PIXEL DATA FOR A PRINTER

(75) Inventor: Peter Johnston, San Mateo, CA (US)

(73) Assignee: Konica Minolta Systems Laboratory, Inc., Foster City, CA (US)

( * ) Notice: Subject to any disclaimer, the term of this patent is extended or adjusted under 35 U.S.C. 154(b) by 1286 days.

This patent is subject to a terminal disclaimer.

(21) Appl. No.: 11/479,896

(22) Filed: Jun. 30, 2006

(65) Prior Publication Data
US 2008/0007744 A1 Jan. 10, 2008

(51) Int. Cl.
*G06K 15/00* (2006.01)
*G06F 3/12* (2006.01)
(52) U.S. Cl. ........................................ 358/1.16; 358/1.1
(58) Field of Classification Search ................... 358/1.1, 358/1.9, 1.11–1.18
See application file for complete search history.

(56) References Cited

U.S. PATENT DOCUMENTS

| | | | |
|---|---|---|---|
| 4,782,398 A | 11/1988 | Mita | |
| 5,041,920 A | 8/1991 | Hayes et al. | |
| 5,477,257 A | 12/1995 | Murata | |
| 5,646,670 A | 7/1997 | Seto et al. | |
| 5,739,842 A | 4/1998 | Murata | |
| 5,760,811 A | 6/1998 | Seto et al. | |
| 5,946,334 A | 8/1999 | Ema et al. | |
| 6,092,171 A * | 7/2000 | Relph | 711/203 |
| 6,215,513 B1 | 4/2001 | Ashikaga | |
| 6,252,675 B1 | 6/2001 | Jacobs | |
| 6,369,911 B1 | 4/2002 | Hattori | |
| 6,472,946 B2 | 10/2002 | Takagi | |
| 6,476,847 B2 | 11/2002 | Satoh et al. | |
| 6,498,617 B1 | 12/2002 | Ishida et al. | |
| 6,603,116 B2 | 8/2003 | Niito | |
| 6,707,563 B1 * | 3/2004 | Barry et al. | 358/1.14 |
| 6,731,317 B2 | 5/2004 | Ema et al. | |
| 6,775,032 B2 | 8/2004 | Jacobs | |
| 7,009,729 B2 | 3/2006 | Fujita | |
| 7,031,025 B1 | 4/2006 | He et al. | |
| 7,038,671 B2 | 5/2006 | Willis et al. | |
| 7,064,859 B1 | 6/2006 | Dittrich et al. | |
| 7,428,075 B2 | 9/2008 | Johnston | |
| 2001/0030769 A1 | 10/2001 | Jacobs | |
| 2001/0030796 A1 | 10/2001 | Yao | |
| 2004/0156079 A1 | 8/2004 | Marshall et al. | |
| 2006/0001467 A1 | 1/2006 | Fujino et al. | |

(Continued)

OTHER PUBLICATIONS

U.S. Appl. No. 11/479,294, filed Jun. 30, 2006.

(Continued)

*Primary Examiner* — Thierry L Pham
(74) *Attorney, Agent, or Firm* — Finnegan, Henderson, Farabow, Garrett & Dunner, LLP

(57) ABSTRACT

An apparatus and method for processing pixel data is presented that includes a plurality of image forming modules coupled to a data control module. The data control module includes a plurality of memory units. Each memory unit can store a portion of an image. The data control module receives a first signal and a second signal and selects at least one of the plurality of image forming modules to send the image portions stored in the plurality of memory units based on a timing relationship between a first image alignment event on the first signal and a second image alignment event on the second signal.

27 Claims, 9 Drawing Sheets

U.S. PATENT DOCUMENTS

| | | | |
|---|---|---|---|
| 2007/0153247 A1* | 7/2007 | Nagasaka | 355/53 |
| 2008/0002018 A1 | 1/2008 | Johnston | |
| 2008/0002228 A1 | 1/2008 | Johnston | |
| 2008/0002229 A1 | 1/2008 | Johnston | |
| 2008/0007745 A1 | 1/2008 | Johnston | |

OTHER PUBLICATIONS

U.S. Appl. No. 11/479,562, filed Jun. 30, 2006.
U.S. Appl. No. 11/480,221, filed Jun. 30, 2006.
U.S. Appl. No. 11/479,596, filed Jun. 30, 2006.
U.S. Appl. No. 11/728,241, filed Jun. 30, 2006.
Notice of Allowance dated Jun. 18, 2010, in related U.S. Appl. No. 11/479,294, filed Jun. 30, 2006, Peter Johnston.
Notice of Allowance dated Mar. 5, 2010, in related U.S. Appl. No. 11/479,294, filed Jun. 30, 2006, Peter Johnston.
Office Action dated Nov. 23, 2009, in related U.S. Appl. No. 11/479,294, filed Jun. 30, 2006, Peter Johnston.
Office Action dated Apr. 17, 2009, in related U.S. Appl. No. 11/479,294, filed Jun. 30, 2006, Peter Johnston.
Notice of Allowance dated Jul. 13, 2009, in related U.S. Appl. No. 11/479,562, filed Jun. 30, 2006, Peter Johnston.
Office Action dated Feb. 20, 2009, in related U.S. Appl. No. 11/479,562, filed Jun. 30, 2006, Peter Johnston.
Office Action dated Jun. 18, 2008, in related U.S. Appl. No. 11/479,562, filed Jun. 30, 2006, Peter Johnston.
Office Action dated Dec. 12, 2007, in related U.S. Appl. No. 11/479,562, filed Jun. 30, 2006, Peter Johnston.
Notice of Allowance dated May 20, 2008, in related U.S. Appl. No. 11/480,221, filed Jun. 30, 2006, Peter Johnston.
Office Action dated Jan. 18, 2008, in related U.S. Appl. No. 11/480,221, filed Jun. 30, 2006, Peter Johnston.
Office Action dated Mar. 26, 2010, in related U.S. Appl. No. 11/479,596, filed Jun. 30, 2006, Peter Johnston.
Office Action dated Apr. 30, 2010, in related U.S. Appl. No. 11/728,241, filed Mar. 23, 2007, Peter Johnston.
Office Action dated Nov. 5, 2009, in related U.S. Appl. No. 11/728,241, filed Mar. 23, 2007, Peter Johnston.

* cited by examiner

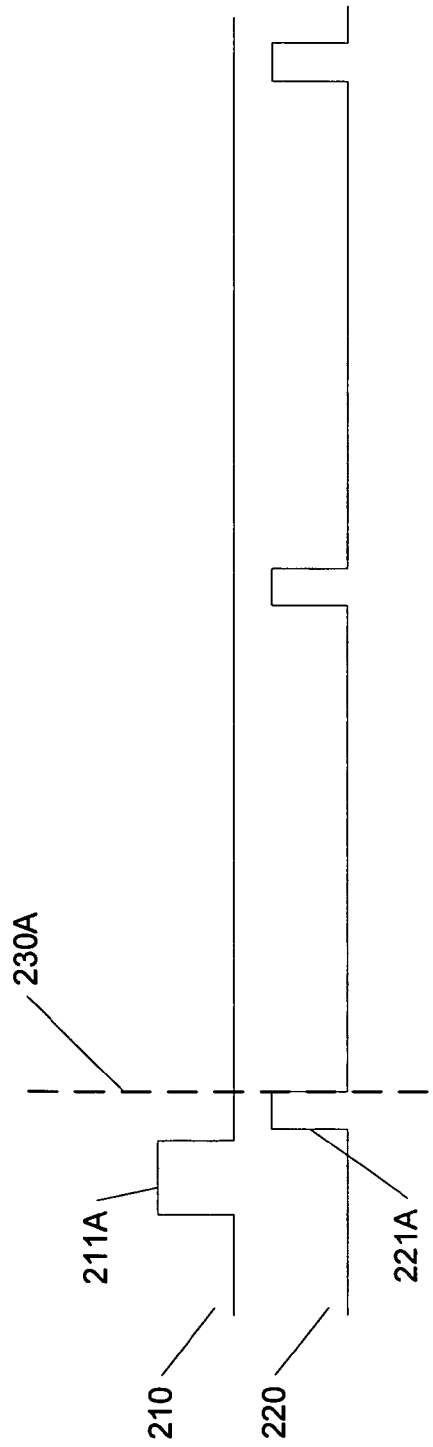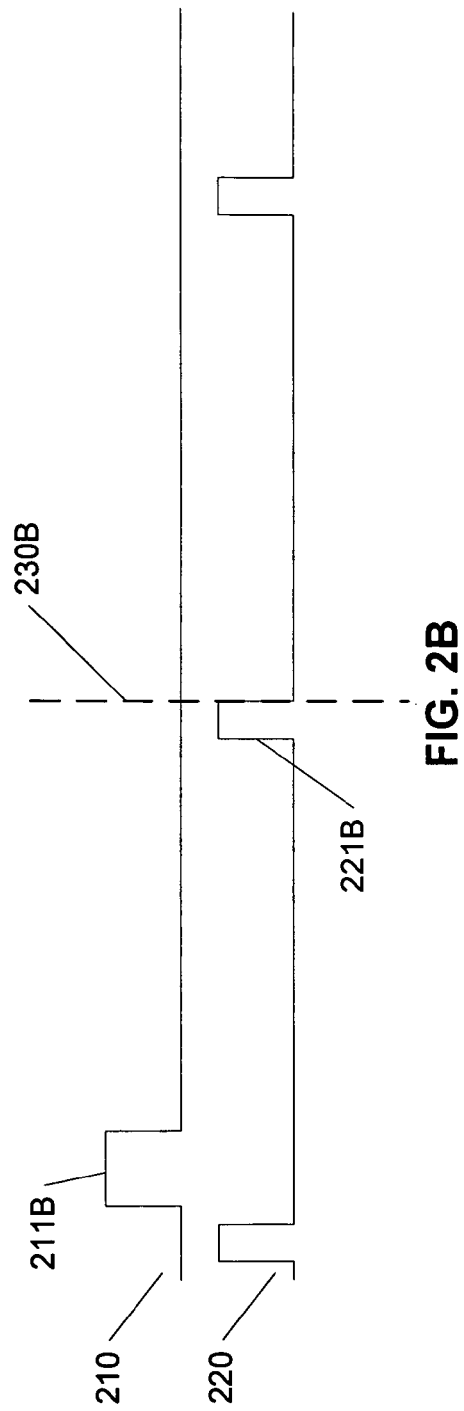

Relative position signal set – Late beam detect

| Pixel data 260 line number | 1st portion of pixel data 260A or 260B | 2nd portion of pixel data 260A or 260B | Occurrence of BD signal 220 |
|---|---|---|---|
| 0 | | | |
| 1 | 380A | 380B | 1 |
| 2 | 380C | 380D | |
| 3 | 380E | 380F | 2 |
| 4 | 380A | 380C | |
| 5 | 380B | 380D | 3 |
| 6 | 380E | 380A | |
| 7 | 380F | 380C | 4 |
| 8 | 380B | 380E | |
| 9 | 380D | 380A | 5 |
| 10 | 380F | 380B | |
| 11 | 380C | 380E | 6 |
| 12 | 380D | 380F | |
| 13 | 380A | 380B | 7 |
| 14 | 380C | 380D | |
| 15 | 380E | 380F | 8 |
| 16 | 380A | 380C | |
| 17 | 380B | 380D | 9 |
| 18 | 380E | 380A | |
| 19 | 380F | 380C | 10 |
| 20 | 380B | 380E | |
| 21 | 380D | 380A | 11 |
| 22 | 380F | 380B | |
| 23 | 380C | 380E | 12 |
| 24 | 380D | 380F | |

Relative position signal not set – Early beam detect

| Pixel data 260 line number | 1st portion of pixel data 260 | 2nd portion of pixel data 260 | Occurrence of BD signal 220 |
|---|---|---|---|
| 0 | | | |
| 1 | 380A | 380B | 1 |
| 2 | 380C | 380D | 2 |
| 3 | 380E | 380F | 3 |
| 4 | 380A | 380B | 4 |
| 5 | 380C | 380E | 5 |
| 6 | 380D | 380F | 6 |
| 7 | 380A | 380C | 7 |
| 8 | 380B | 380E | 8 |
| 9 | 380D | 380A | 9 |
| 10 | 380F | 380C | 10 |
| 11 | 380B | 380D | 11 |
| 12 | 380E | 380A | 12 |
| 13 | 380F | 380B | 13 |
| 14 | 380C | 380D | 14 |
| 15 | 380E | 380F | |
| 16 | 380A | 380B | |
| 17 | 380C | 380E | |
| 18 | 380D | 380F | |
| 19 | 380A | 380C | |
| 20 | 380B | 380E | |
| 21 | 380D | 380A | |
| 22 | 380F | 380C | |
| 23 | 380B | 380D | |
| 24 | 380E | 380A | |
| 25 | 380F | 380B | |
| 26 | 380C | 380D | |
| 27 | 380E | 380F | |

FIG. 6

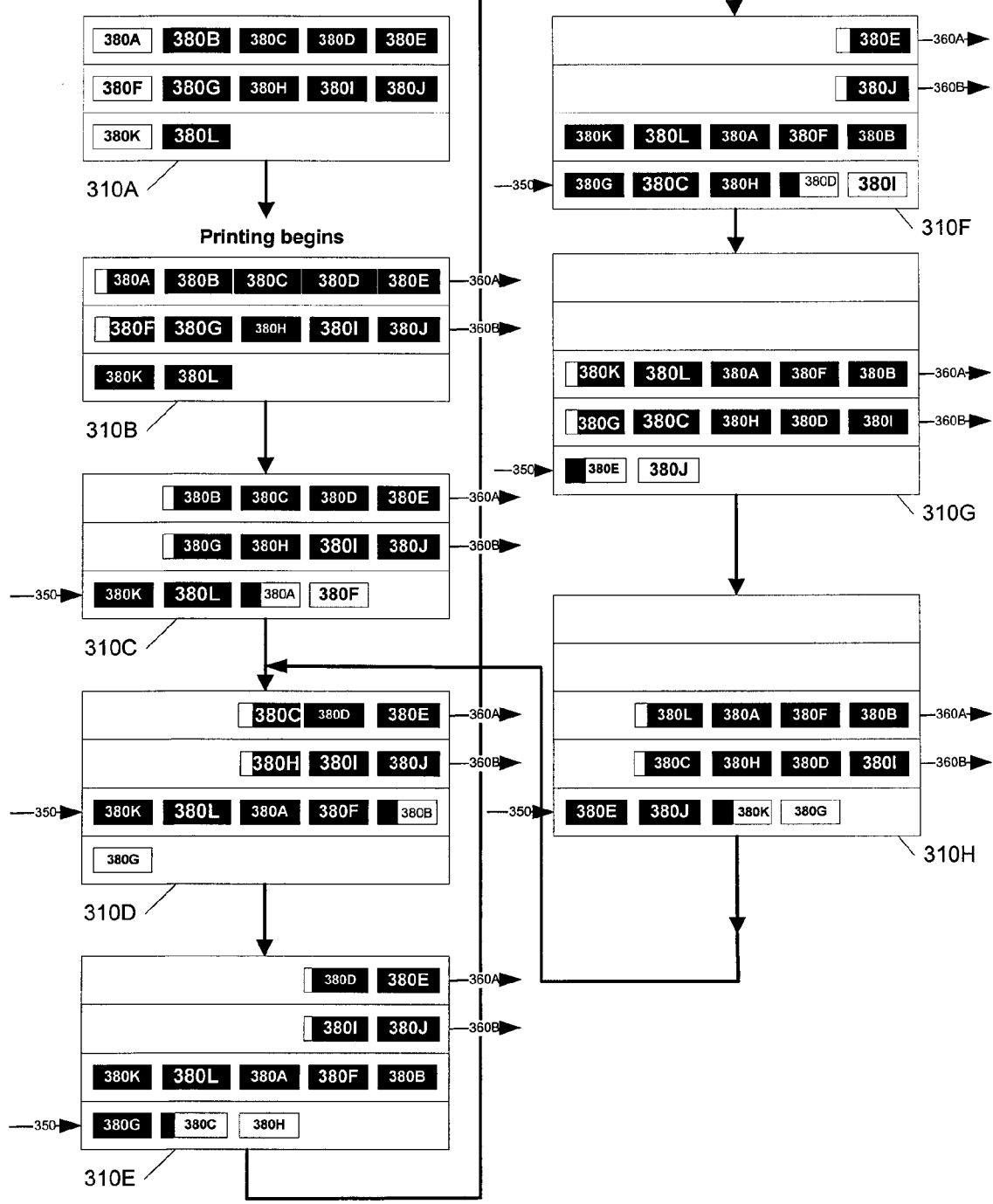

SYSTEMS AND METHODS FOR PROCESSING PIXEL DATA FOR A PRINTER

FIELD OF THE INVENTION

This invention generally relates to electronic printer technology. The invention more particularly relates to processing pixel data for a printer.

CROSS-REFERENCE TO RELATED APPLICATIONS

This application is related to the following U.S. patent applications "Systems for Generating a Pulse Width Modulated Signal", "Method and Apparatus for Image Alignment", "Circuitry to Support Justification of PWM Pixels", and "Systems and Methods for Processing Pixel Data for a Printer" filed concurrently herewith. Each of the above applications is hereby incorporated in its entirety for all purposes.

BACKGROUND OF THE INVENTION

Single beam laser printers can print a single line to paper during one pass of the laser. In order to increase the print speed of a single beam laser printer, its internal elements can be run faster and/or at a higher clock rate. There are limits, however, to the speed at which the internal elements of a printer may run. Dual-beam laser printers overcome some of these limitations by scanning out two lines of pixel data simultaneously to a photosensitive drum.

Dual beam laser printers may be designed so that odd lines of an image are scanned out with a first laser and even lines of the image are scanned out with a second laser. For dual beam laser printers, each line of pixel data can be separately accessed in memory, and the systems often use separate Direct Memory Access (DMA) channels to main memory for the odd and even lines of the image.

In some laser printers, a top of data (TOD) event signal or top of page event signal may be sent to the image electronics of a printer when paper is fed through the laser printer. A beam detect (BD) event signal may be generated during each horizontal pass of the laser. The TOD signal may be asynchronous with the BD signal. Therefore, it is possible for the data sent to the TOD signal to be nearly a full cycle out of sync with the start of each pass, corresponding to the "hsync" or BD signal. In the case of a single-beam laser printer, this means that the data sent to the image may have a variation of up to one printed line with respect to the TOD signal, and therefore, there may be a variation in where the first line of the page will be printed from one printed page to another. For a dual-beam laser printer, the problem may be exacerbated. Since data for up to two lines of an image may be printed simultaneously, a variation of nearly a full cycle may result in a variation in the printed image of up to two lines. In general, as the number of lines drawn per cycle increases, the misalignment of the printed page with the top of page signal is exacerbated further. For example, in a tri-beam printer, three lines of data are printed simultaneously, and the difference in alignment between the TOD signal and the BD signal may result in a difference of up to three printed lines between two printed pages.

In laser printers that have multiple components, such as four-color cyan (C), magenta (M), yellow (Y), and black (K) ("CMYK") printers, the complete image may be made up of the four components, and the four components may be laid down sequentially, one on top of the other. Image quality is based at least on the vertical alignment of the components. In a single beam printer, each of these signals may be up to one line out of alignment with each other because TOD signal is asynchronous with BD signal. In a multi-beam printer, as noted above, the potential for misalignment is exacerbated in proportion to the number of lines that are printed simultaneously. In the case of a multi-pass, multi-beam printer, because each of the components is laid down sequentially, each component of the image may be misaligned in proportion to the number of beams in the printer. The misalignment among the components contributes to image-quality reduction.

Both single and multi-beam printers may store pixel data in memories. Each of these memories may be used to store and write out a single line of pixel data. Data written into and read from these memories is often synchronized with the printing of images. Because a new line of pixel data is often stored at the same time that an old line of pixel data is written out printers often use multiple memories, each capable of storing a single line of pixel data. For multi-beam printers, the number of memories may be further increased by the number of beams in the printer. For example, a dual-beam printer may need four memories, each capable of storing a complete line of pixel data. The number of memories and accompanying circuitry or software to manage and synchronize their operation increases the cost and complexity of printers.

Thus, there is a need for a method, system, and apparatus for processing pixel data for a printer that allows alignment of the printed image and optimizes memory utilization.

SUMMARY OF THE INVENTION

In accordance with the invention, a system and method for processing pixel data is presented that includes a plurality of image forming modules coupled to a data control module. The data control module includes a plurality of memory units. Each memory unit can store a portion of an image. The data control module receives a first signal and a second signal and selects at least one of the plurality of image forming modules to send the image portions stored in the plurality of memory units based on a timing relationship between a first image alignment event on the first signal and a second image alignment event on the second signal.

In some embodiments, the timing relationship may correlate image forming modules with image portions so that image portions are written out by corresponding image forming modules. In some embodiments, a set of memory units may store contiguous portions of a line of image pixel data, and successive sets of memory units store successive lines of image pixel data.

In some embodiments, one or more memory units of the plurality of memory units may be used to store the top-most line of pixel data in the image. The first signal may be a vertical synchronization signal and the first image alignment event may be a top of data event or top of page event. The second signal may be a horizontal synchronization signal and the second image alignment event may be a horizontal synchronization event or beam detect event.

In some embodiments, the timing relationship may be evaluated by comparing the time difference between the first image alignment event and the second image alignment event to a threshold. The threshold may correspond to a fraction of the time interval between two successive occurrences of the second image alignment event on the second signal. The fraction may be defined as one divided by the number of image forming modules used in the plurality of image forming modules. The second image alignment event may be a beam detect event and the threshold may correspond to a fraction of the cycle between beam detect events.

In some embodiments, the image forming modules simultaneously write successive lines of pixel data to a printed image. A first image forming module may write an uppermost line of pixel data; and each subsequent image forming module may write a subsequent line of pixel data. The data control module may send the pixel data corresponding to the topmost line of pixel data to an (A+1−N)th image forming module in response to a first image alignment event that occurs during an (N)th subinterval of (A) subintervals of time interval (T), where A is the number of image forming modules, and T is the time interval between two occurrences of the second image alignment event.

In some embodiments, the data control module may dynamically associate two or more memory units of the plurality of memory units with each line of pixel data, and each memory unit associated with a line of pixel data may store a portion of the line of pixel data. The data control module may write out a first portion of the first line of pixel data from a particular memory unit of the two or more memory units to the chosen image forming module; and, after the data control module writes out the first portion of the first line of pixel data, the data control module may associate the particular memory unit with a different line of pixel data.

In some embodiments, the memory units may be first-out (FIFO) memories.

In some embodiments, the number of memory units associated with each line of pixel data may be determined based on the physical memory capacity of available memory units.

Additional objects and advantages of the invention will be set forth in part in the description, which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate one or more embodiments of the invention and together with the description, serve to explain the principles of the invention.

BRIEF DESCRIPTION OF THE DRAWINGS

FIGS. 2A and 2B show example timing diagrams.

FIG. 6 shows an exemplary memory unit pattern diagram.

FIG. 7 shows a block diagram depicting exemplary stages of a memory module that use five memory units per line of pixel data and outputs two lines of pixel data.

DETAILED DESCRIPTION

Reference will now be made in detail to one or more exemplary embodiments of the present invention as illustrated in the accompanying drawings. Wherever possible, the same reference numbers will be used throughout the drawings to refer to the same or like parts.

Figure 1:
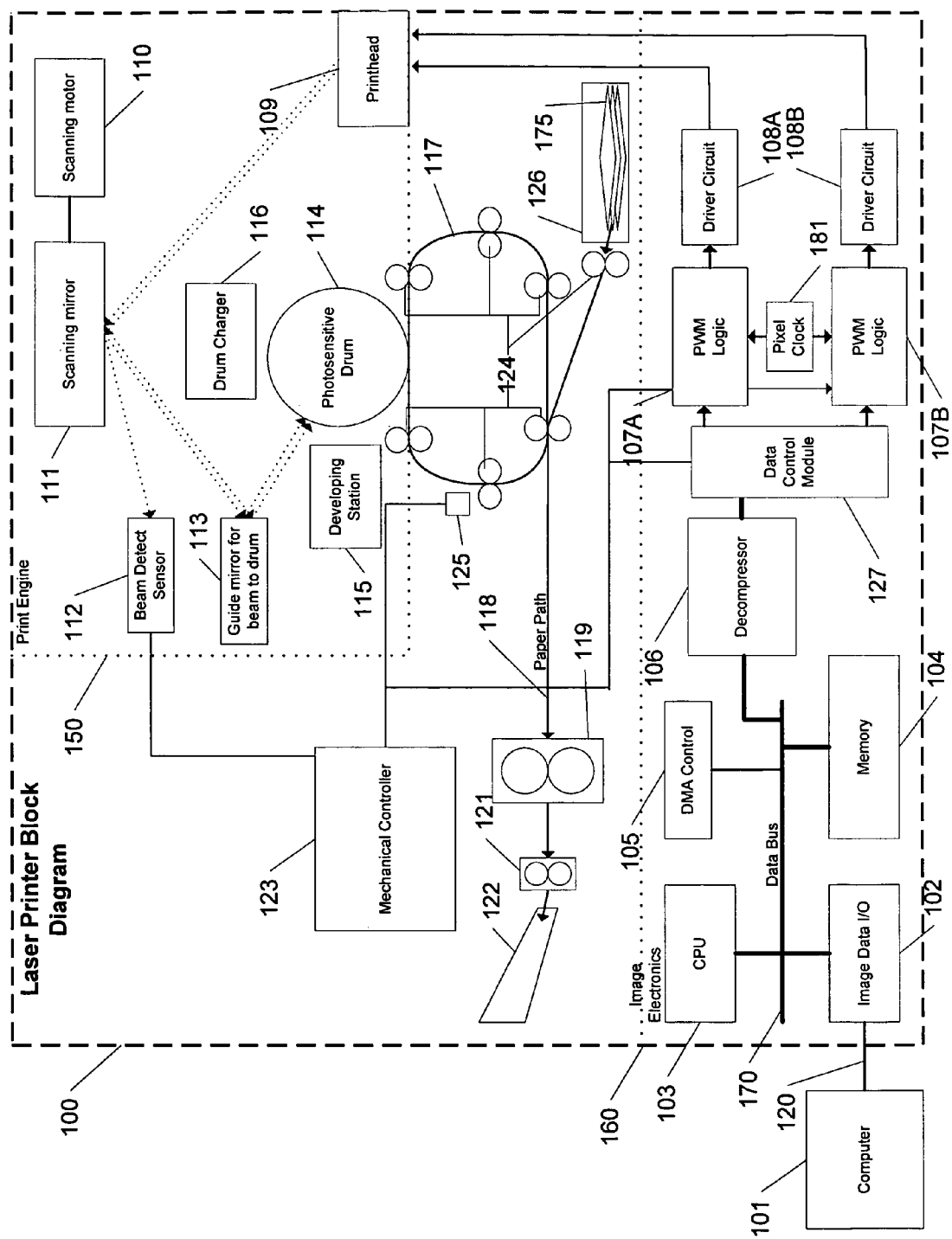
FIG. 1 shows a block diagram of an exemplary laser printer connected to an exemplary computer.

FIG. 1 shows a block diagram of an exemplary printer 100, which is coupled to exemplary computer 101 using connection 120. Computer 101 may send image data to image electronics subsystem 160 over connection 120. Data received by printer 100 may be routed internally along internal data paths, such as exemplary data bus 170, and other data and control signal paths (not shown) to various internal functional modules of printer 100 as determined by control logic in printer 100. As shown in FIG. 1, image data input/output ("IO") module 102, central processing unit (CPU) 103, direct memory access (DMA) control module 105, memory 104, and decompressor module 106, may be coupled using data bus 170.

In some embodiments, data received by image data I/O module 102 may be placed in memory 104 using DMA control module 105 under the control of the CPU 103. Decompressor module 106 may be coupled to data control module 127. Data control module 127 may, in turn, be coupled to multiple pulse width modulation (PWM) logic modules 107A, 107B. Decompressor module 106 may receive compressed pixel data, decompress the received pixel data, and send it to data control module 127. In some embodiments, data control module 127 may take as input multiple decompressed lines of the image and send fewer than all of those lines to each of multiple PWM logic modules 107A, 107B. Various data and control signal paths may also couple PWM logic modules 107A and 107B, pixel clock generation module 181, driver circuits 108A and 108B, printhead 109, mechanical controller 123, beam detect sensor 112, data control module 127, and transfer belt position sensor 125. Beam detect sensor 112 and/or belt position sensor 125 may each generate one or more signals related to scan lines in images.

Driver circuits 108A and 108B may be communicatively coupled to PWM logic modules 107A and 107B, respectively, and printhead 109. In some embodiments, printhead 109 may be a laser printhead. Scanning mirror 111 may be mechanically or electromagnetically coupled to scanning motor 110, which may be used to rotate scanning mirror 111. Light from printhead 109 may be transmitted to scanning mirror 111 and scanning mirror 111 may reflect that light, at different times, to beam detect sensor 112 and beam-to-drum guide mirror 113. Beam-to-drum guide mirror 113 may reflect light from scanning mirror 111 to photosensitive drum 114. Drum charger 116 may be used to charge photosensitive drum 114.

In some embodiments, each path along which pixel data from data control module 127 may, in various forms, be processed may be an image forming module and there may be multiple image forming modules per printer 100. Alternatively, a printer may have one image forming module and each path along which pixel data from data control module 127 may, in various forms, be processed may be an image forming submodule and the image forming submodules may be together form a single image forming module. The terminological association of a data path along which pixel data may be processed with the either of the terms "image forming module" or "image forming submodule" does not limit the invention described herein. The image forming module or image forming submodule may comprise a variety of modules. In some embodiments, for example, pixel data may be passed in various forms from data control module 127 to an image forming module (or an image forming submodule), where the image forming module or submodule comprises the modules: PWM logic module 107A or 107B and driver circuit 108A or 108B, respectively. In some embodiments, an image forming module or submodule may include PWM logic module 107A or 107B, driver circuit 108A or 108B, printhead 109, scanning mirror 111, beam-to-drum guide mirror 113, developing station 115, photosensitive drum 114, and drum charger 116. In other embodiments, image forming modules and submodules may comprise other combinations of modules and devices.

Paper 175 may be passed from paper input tray 126 through transfer rollers 124 to transfer belt 117 where latent images from photosensitive drum 114 may be transferred to paper 175. In some embodiments, latent images from photosensitive drum 114 may be developed with toner at developing station 115 before transfer to paper 175. The transfer of images from photosensitive drum 114 to paper 175 may occur while paper 175 is on transfer belt 117 or by other methods. After the image has been transferred, paper 175 may be moved over paper path 118 using transfer rollers 124 and past fuser 119, guide rollers 121, and to paper output tray 122. Fuser 119 may facilitate the bonding of the transferred image to paper 175.

Printer 100 may be a laser printer, an LED printer, or any other printer consistent with principles of the present invention. Computer 101 may be a computer workstation, desktop computer, laptop computer, or any other computing device capable of being used with printer 100. Connection 120 may be implemented as a wired or wireless connection using conventional communication protocols and/or data port interfaces. In general, connection 120 can be any communication channel that allows transmission of data between the devices. In one embodiment, for example, the devices may be provided with conventional data ports, such as USB, FIREWIRE and/or serial or parallel ports for transmission of data through appropriate connection 120. The communication links could be wireless links or wired links or any combination consistent with embodiments of the present invention that allows communication between computing device 101 and printer 100.

Data transmitted to printer 100 by computer 101 may also include destination addresses and/or commands to facilitate routing. In some embodiments, data bus 170 may include a subsystem that transfers data or power among modules. Data bus 170 may logically connect several modules over the same set of wires or over separate wires for each connection. Data bus 170 may be any physical arrangement that provides the same logical functionality as a parallel bus and may include both parallel and bit-serial connections. Further, data bus 170 may be wired in either an electrical parallel or daisy chain topology, or connected by switched hubs.

Exemplary print engine 150 of printer 100 may include beam detect sensor 112, beam-to-drum guide mirror 113, developing station 115, photosensitive drum 114, drum charger 116, scanning mirror 111, scanning motor 110, and printhead 109. Beam detect sensor 112 and/or belt position sensor 125 may each generate one or more signals for each scan line in an image, or for a set of scan lines in an image, or for each image and send the generated signals to mechanical controller 123, which then sends signals to PWM logic modules 107A, 107B and/or data control module 127. As shown in FIG. 1, exemplary image electronics subsystem 160 may include CPU 103, image data I/O module 102, memory 104, DMA control module 105, data bus 170, decompressor module 106, PWM logic modules 107A and 107B, and driver circuit 108A and 108B. The various modules and subsystems described above may be implemented by hardware, software, or firmware or by various combinations thereof.

The image data sent from computer 101 to printer 100 may be compressed. In some embodiments, the compressed image data may be in a line-sequential compressed format. Various other formats such as Postscript, PCL, and/or other public or proprietary page description languages may also be used to transfer image data. Image data received by image data I/O module 102 may be placed in memory 104. In some embodiments, when image data for a complete page has been stored in memory 104, a print sequence may be initiated. In some embodiments, mechanical controller 123 may initiate operations of scanning motor 110, photosensitive drum 114, and transfer belt 117 through appropriate data and/or control signals.

Beam detect sensor 112 can detect a laser beam's position and generate pulses that are sent to image electronics subsystem 160 so that image data can be properly aligned from line to line in a printed image. In some embodiments, at the beginning of a scan of each line of the image, light from the printhead 109 may be reflected by scanning mirror 111 onto beam detect sensor 112. Beam detect sensor 112 may signal mechanical controller 123 which, in turn, may send a beam detect signal 220 to PWM logic modules 107A, 107B and/or data control module 127. In some embodiments, a separate signal typically referred to as top of data (TOD) or "vsync" may also be generated by mechanical controller 123, based on information received from transfer belt position sensor 125. The TOD or vsync signal indicates when image data transfer can begin for paper 175. For example, when paper 175 passes transfer belt position sensor 125, a TOD signal may be sent to PWM logic modules 107A, 107B and/or data control module 127 via mechanical controller 123. Once the TOD signal is received, CPU 103 may initiate a transfer from memory 104 to decompressor module 106. Decompressor module 106 may decompress image data and pass the resulting raw image data to data control module 127, which may then appropriately process and send the data to PWM logic modules 107A, 107B. The resultant PWM pulses from PWM logic modules 107A and 107B may then be streamed to driver circuits 108A and 108B, respectively, which may then transmit the PWM pulses to printhead 109.

In some embodiments, laser light from printhead 109 may be pulsed and reflected off scanning mirror 111 and beam-to-drum guide mirror 113, causing a latent image of charged and discharged areas to be built up on photosensitive drum 114. A toner may develop this latent image at developing station 115 and the latent image transferred to transfer belt 117. For a multi-component image, such as a color image, the latent image building process may repeat for each of the components. For example, for CMYK color printers, which use cyan ("C"), magenta ("M"), yellow ("Y"), and black ("K"), the latent image building process on photosensitive drum 114 may be repeated for each of the colors C, M, Y, and K. When all components have been assembled on transfer belt 117, paper 175 may be fed from paper input tray 126 to transfer roller 124 where the image may be transferred to paper 175. Fuser 119 may then fix the toner to paper 175, which can be sent to paper output tray 122 using guide rollers 121.

Pixel clock generation module 181 may be a crystal oscillator or a programmable clock oscillator, or any other appropriate clock generating device. In some embodiments, such as in a "multi-pass" printer 100, which sends the video data for each color serially in sequence, the frequency of the clock generated by the pixel clock generation module 181 may be fixed among each pass of the printer. For example for a multi-pass printer 100, the pixel clock generation module 181 may be a crystal oscillator. In another embodiment, such as a printer 100 that uses multiple sets of print engines 150, sometimes collectively referred to as a "tandem engine", the frequency of each channel may be calibrated if the frequencies differ among the pixel clocks corresponding to each of the color components. In such embodiments, one or more programmable clock oscillators may be used to allow for calibration.

Exemplary embodiments of printer 100 may include driver circuit 108A or 108B driving multiple sets of print engines 150, which may be connected to multiple printheads 109. In some embodiments, printheads 109 could all be laser printheads. There may also be a plurality of individual modules of image electronics subsystem 160. For example, a single decompressor module 106 may be connected to multiple data control modules 127, which may each, in turn, be connect to one or more PWM logic modules 107A and 107B. Each PWM module 107A and 107B may in turn be connected to one or more pixel clock generation modules 181 and one or more driver circuits 108A or 108B. Decompressor module 106 could provide each data control module 127 with one or more color components of an image, which would then be sent to the multiple PWM modules 107A and 107B and subsequently to multiple driver circuits 108A and 108B for onward transmission to one or more sets of print engine 150.

In other embodiments, multiple decompressor modules 106 may each be coupled to one or more data control module 127, which may, in turn each be coupled to one or more PWM logic modules 107A and 107B. Each decompressor module 106 may provide a corresponding data control module 127 with a decompressed component of the image; each data control module 127 may then transmit the data to one or more PWM logic modules 107A, 107B. In other embodiments, a single PWM logic module 107A or 107B could provide multiple components of the image to multiple driver circuits 108A and 108B. Whereas the diagrams depict only one or two of some components of exemplary printer 100, as discussed herein and as would be obvious to a person skilled in the art, more or fewer of various components could be used in various embodiments. Furthermore, the components may be organized or coupled in a manner different than illustrated in exemplary printer 100

In some embodiments, printer 100 may have multiple lasers per laser printhead. Printhead 109 may receive multiple lines of data from driver circuit 108A or 108B and project the multiple lines of data to scanning mirror 111. Scanning mirror 111 may then reflect the multiple lines of data to beam detect sensor 112 and guide mirror 113, which may reflect the multiple lines to photosensitive drum 114. In some embodiments, the beam detect sensor 112 may detect a signal, such as a laser signal, reflected off of the scanning mirror 111, or may also detect multiple signals reflected off scanning mirror 111.

The coupling discussed herein may include, but is not limited to, electronic connections, coaxial cables, copper wire, and fiber optics, including the wires that comprise data bus 170. The coupling may also take the form of acoustic or light waves, such as lasers and those generated during radio-wave and infra-red data communications. Coupling may also be accomplished by communicating control information or data through one or more networks to other data devices. Mechanical or electro-mechanical coupling as used herein may include, but is not limited to, the use of physical components such as motors, gear coupling, use of universal joints, or any other mechanical or electromechanical device usable to couple items together.

Each of the logical or functional modules described above may comprise multiple modules. The modules may be implemented individually or their functions may be combined with the functions of other modules. Further, each of the modules may be implemented on individual components, or the modules may be implemented as a combination of components.

For example, CPU 103, decompressor module 106, PWM logic modules 107A and 107B, may each be implemented by a field-programmable gate array (FPGA), an application-specific integrated circuit (ASIC), a complex programmable logic device (CPLD), a printed circuit board (PCB), a combination of programmable logic components and programmable interconnects, single CPU chip, a CPU chip combined on a motherboard, a general purpose computer, or any other combination of devices or modules capable of performing the tasks of modules 103, 106, 107A, or 107B. Memory 104 may comprise a random access memory (RAM), a read only memory (ROM), a programmable read-only memory (PROM), a field programmable read-only memory (FPROM), or other dynamic storage device, coupled to data bus 170 for storing information and instructions to be executed by image electronics subsystem 160.

FIGS. 2A and 2B are exemplary timing diagrams illustrating the relationship between events on exemplary TOD signal 210 and BD signal 220. In some embodiments, TOD event 211, which may correspond to either TOD event 211A or 211B, occurs when the first line is to be printed to paper 175 by one of a plurality of image forming modules in printer 100. Image forming modules may print horizontally sequential lines simultaneously. In some embodiments, BD event 221, which may refer to BD events 221A or 221B, may indicate that each image forming module could start printing a line to paper 175. Since TOD signal 210 may be asynchronous with BD signal 220, TOD event 211 could occur "early" in the cycle between BD events, as depicted in FIG. 2B, or could occur "late," as depicted in FIG. 2A. Depending on when TOD event 211 occurs in the cycle between BD events 221, paper 175 may be positioned such that where each image forming module would print on paper 175 could differ by up to (A) lines, where (A) is the number of image forming modules. For example, if there were two image forming modules, then, depending on whether TOD event 211 was early or late in the cycle of BD events 221, the alignment of paper 175 with respect to the image forming modules could differ by up to the height of two lines.

In some embodiments, therefore, the decision of which image forming module to use to print the first line of an image to paper 175 may depend on when, in the cycle of BD events 221, TOD event 211 occurs. For example, if TOD event 211 occurs late in the cycle of BD events 221, as depicted in FIG. 2A, then paper 175 may be positioned so that the image forming modules would print lower on paper 175. As such, in some embodiments, when TOD event 211 occurs late in the cycle of BD events 221, each image forming module may print a line of the image. If, however, TOD event 211 occurs early in the cycle of BD events 221, as depicted in FIG. 2B, then the image forming modules may be positioned to print higher on paper 175. As such, in order to align the first line printed to paper 175 similarly, regardless of whether TOD event 211 occurs early or late, the first line of an image may be printed using the second image forming module (and the horizontally preceding image forming module may print nothing in the first cycle) when TOD event 211 occurs early. By choosing which image forming module to use based on when TOD event 211 occurs, the printed image may be similarly aligned (possibly within the height of one printed line) regardless of when TOD event 211 occurs. In some embodiments, subsequent lines of pixel data may be written from the first and second image forming modules in sequential order regardless of whether a late TOD event 211A or an early TOD event 211B occurred. TOD events 211 and BD events 221, may take the form of pulses or any other detectable events on signals 210 and 220.

In some embodiments, where there are (A) image forming modules, the relative timing relationship between BD event 221 and TOD event 211A or 211B may define which of the (A) image forming modules print which lines of pixel data. In some embodiments, for example, where there are five image forming modules, then if BD event occurs within a particular threshold, such as within the first one-fifth of the time interval between BD events 221, then during a first pass of printing, only the fifth image forming module may print a line of pixel data, and the fifth image forming module may print the first line of pixel data in the image. In some embodiments, if TOD event 211 occurs in the second fifth of the time interval between BD events 221, then during a first pass of printing, only the fourth and fifth image forming modules may print lines of pixel data. In some embodiments, the fourth image forming module may print the first line of pixel data in the image and the fifth image forming module may print the second line of pixel data in the image. In some embodiments, in general, when TOD event 211A or 211B occurs in the (N)th subinterval of (A) equally-sized subintervals of the time interval between BD events 221, then the first line of pixel data in the image may be printed using the (A+1−N)th image forming module and subsequent lines of pixel data may be printed with subsequent image forming modules.

Figure 3:
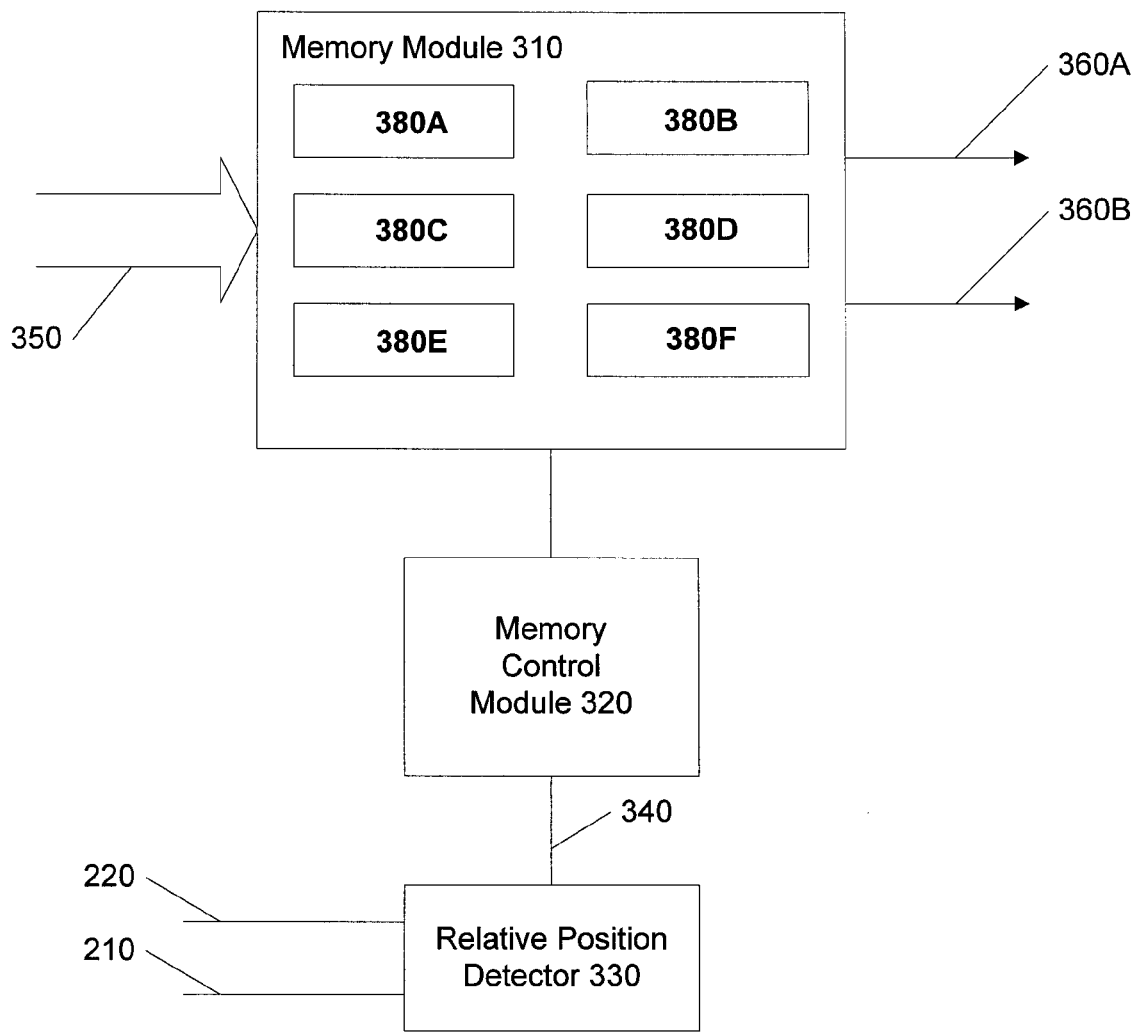
FIG. 3 shows a block diagram illustrating an exemplary data control module.

FIG. 3 shows a block diagram illustrating an exemplary data control module 127. As shown in FIG. 3, data control module 127 may comprise memory control module 320 coupled to memory module 310 and relative position detector 330. Exemplary memory module 310 may comprise multiple memory units 380A, 380B, 380C, 380D, 380E, and 380F. Memory module 310 may be a first-in, first-out (FIFO) array that may be implemented as an array of shift registers. In some embodiments, memory units 380A, 380B, 380C, 380D, 380E, and 380F may comprise RAM, ROM, PROM, FPROM, or other types of dynamic storage, and may constitute logical or physical portions of memory module 310. In some embodiments, one or more of memory units 380A, 380B, 380C, 380D, 380E, and 380F may be used, alone or in combination, to store one line of pixel data for an output image of exemplary printer 100. For example, any pair of memory units 380A, 380B, 380C, 380D, 380E, and 380F may be used to store a single line of pixel data 350.

In some embodiments, memory module 310 and memory control module 320 may be coupled to decompressor module 106, which may send pixel data 350 to memory module 310. Memory control module 320 may control the flow of pixel data 350 to/from memory module 310. In some embodiments, event signals such as exemplary signals 220 and 210 may be input to relative position detector 330, which may determine the positions of events or pulses, such as TOD events 211 and BD events 221. For example, relative position detector 330 may generate a relative position signal 340 based on signals 220 and 210.

In some embodiments, memory module 310 may be coupled to PWM logic modules 107A and 107B and may output first pixel data 360A to PWM logic module 107A and second pixel data 360B to PWM logic module 107B. First pixel data 360A and second pixel data 360B may each correspond to a single line of pixel data for a printed image. In other embodiments, memory module 310 may be coupled to multiple image forming modules (which may each comprise a PWM logic module 107A or 107B), and each of pixel data 360A and 360B may be written to one of the image forming modules.

In some embodiments, relative position detector 330 may be implemented using any appropriate control logic implemented in a FPGA, an ASIC, a CPLD, a PCB, a combination of programmable logic components and programmable interconnects, a CPU, or any other combination of devices or modules capable of performing the tasks of relative position detector 330. In some embodiments, relative position signal 340 may be generated by relative position detector 330. In other embodiments, relative position signal 340 may be generated by any other appropriate logical device, apparatus or module.

Figure 4A:
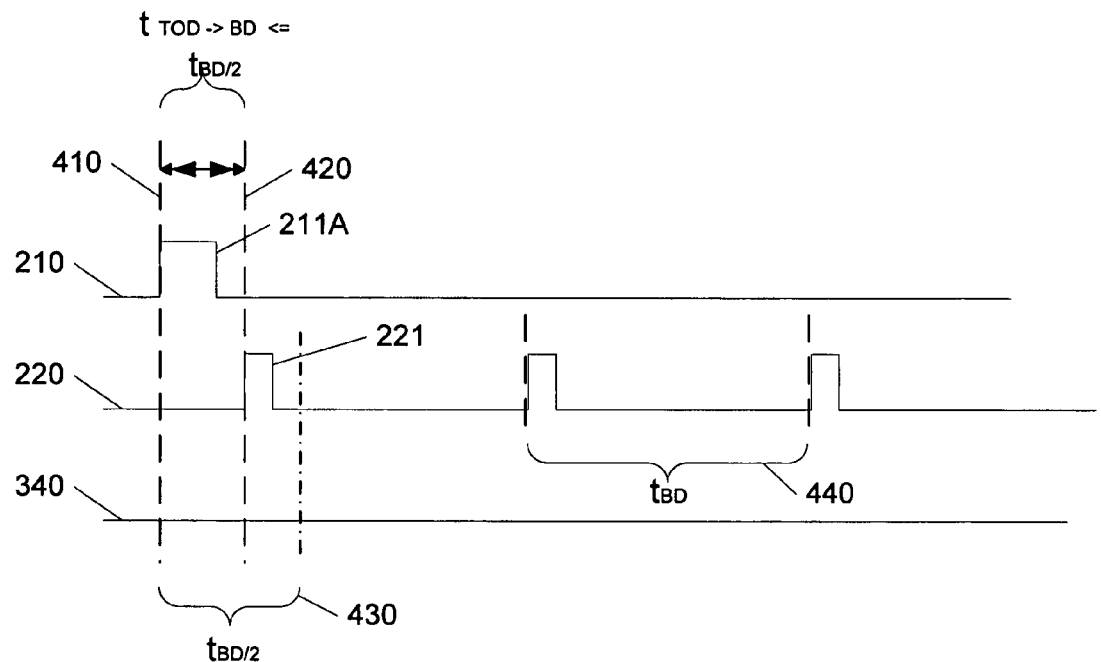
FIG. 4A shows an exemplary timing diagram that depicts the detection of a late TOD event.
Figure 4B:
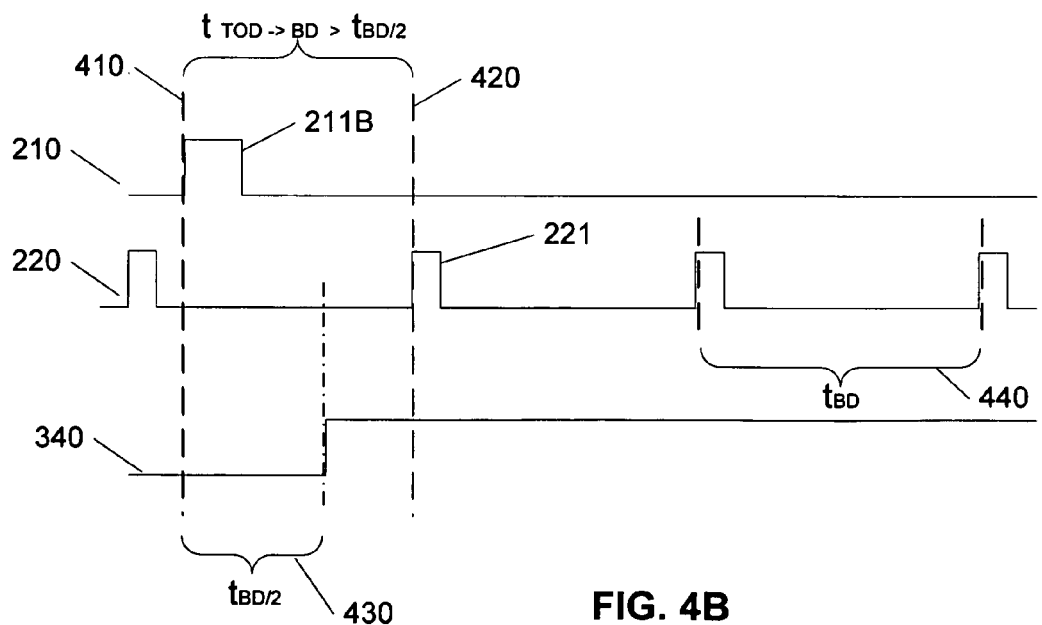
FIG. 4B shows an exemplary timing diagram that depicts the detection of an early TOD event.

FIG. 4A is an exemplary timing diagram that depicts the detection of a late TOD event 211A. FIG. 4B is an exemplary timing diagram that depicts the detection of an early TOD event 211B. Exemplary timing diagrams 4A and 4B may correspond to the event sequence for relative position detector 330. In some embodiments, relative position detector 330 may be edge-triggered based on: the rising edge of TOD event 211A, which may correspond to TOD signal transition 410; and the rising edge of BD event 221, which may correspond to BD signal transition 420. In FIGS. 4A and 4B, BD cycle 440 may be the time between signal transitions on BD signal 220. Accordingly, BD half-cycle 430 may be one-half the time between signal transitions on BD signal 220. A TOD event 211 that occurs outside a time frame defined by a threshold, such as during the second half of the BD cycle 440, as in FIG. 4A, may be designated as a late TOD event 211A. A TOD event 211 that occurs within a time frame defined by a threshold, such as during the first half of the BD cycle 440, as in FIG. 4B, is designated as an early TOD event 211B.

As shown in FIG. 4A, if the difference in time between BD signal transition 420 and TOD signal transition 410 is shorter than BD half-cycle 430, then relative position signal 340 may not be set, indicating a late TOD event 211A.

As shown in FIG. 4B, if the difference in time between TOD signal transition 410 and BD signal transition 420 is longer than BD half-cycle 430, then relative position signal 340 may be set, indicating an early TOD event 211B.

In some embodiments, relative position detector 330 may be falling-edge triggered. In general, the signals depicted in FIG. 4 are exemplary and for illustrative purposes only and other transitions and/or orientations of the signals are possible based on individual implementations. For example, TOD signal transition 410 may correspond to TOD signal 210 transitioning from high to low; BD signal transition 420 may correspond to BD signal 220 transitioning from high to low; and setting relative position signal 340 may correspond to a falling edge of relative position signal 340.

Figure 5:
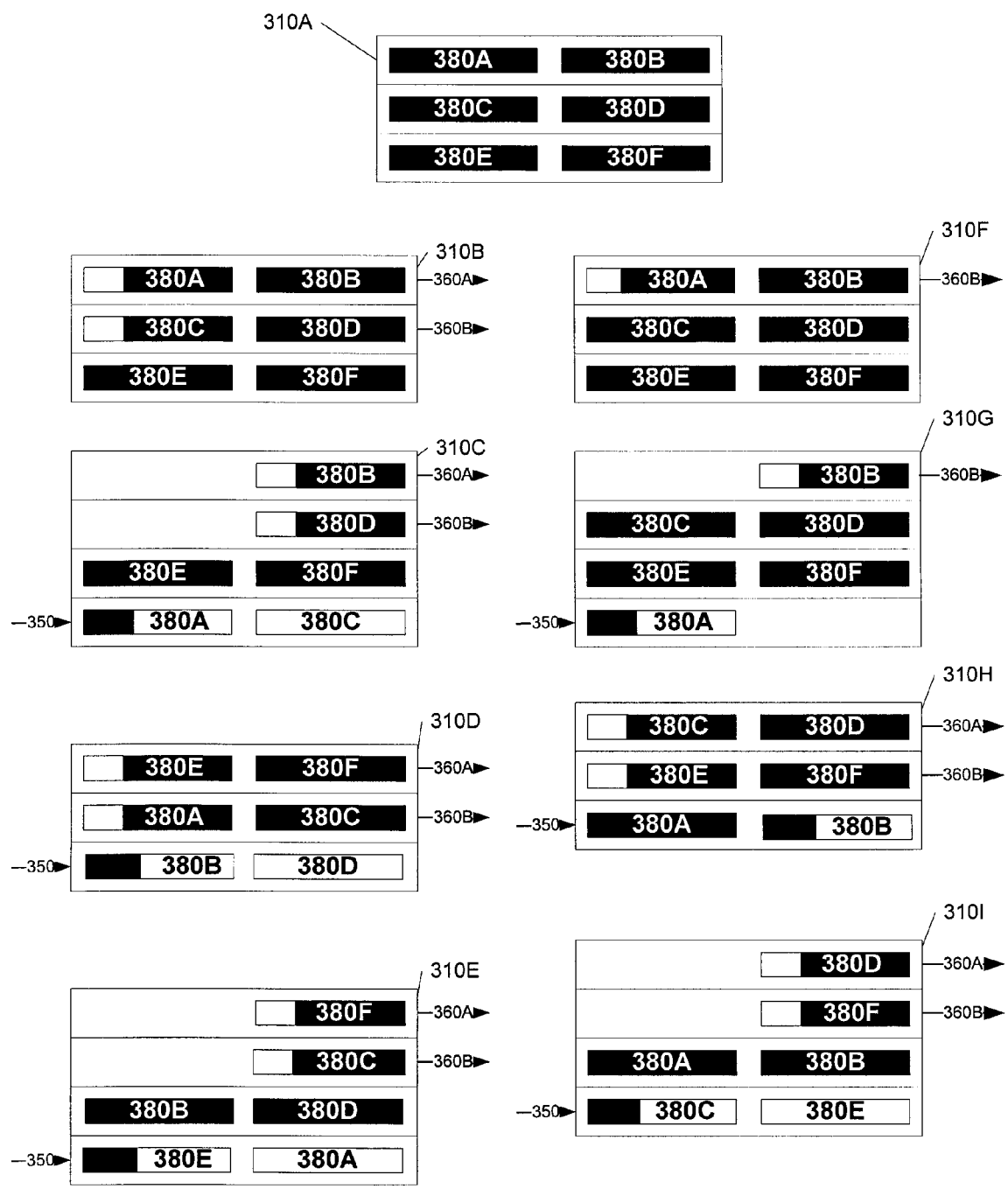
FIG. 5 shows a block diagram depicting exemplary stages of a memory module.

FIG. 5 shows a block diagram depicting various exemplary stages of memory module 310. As shown in FIG. 5, each of stages 310A, 310B, 310C, 310D, 310E, 310F, 310G, 310H, and 310I may represent memory module 310 at various points in writing out pixel data 360A and 360B. In some embodiments, pixel data 360A and 360B may correspond to lines in a printed image that are printed simultaneously. For example, first pixel data 360A may correspond to a line of pixel data that is printed concurrently with and immediately above second pixel data 360B. In some embodiments, each of pixel data 360A and 360B may correspond to an image forming module in printer 100.

As discussed in some examples and embodiments herein, in order to align a printed image within one printed line, regardless of when TOD event 211 occurs, the choice of image forming module to be used to print the first line of an image may be based on the relative position of TOD event 211 and BD events 221. For example, after the occurrence of a late TOD event 211A, data may be written out to all image forming modules. Therefore, if there is a late TOD event 211A, then data may be written out to pixel data outputs 360A and 360B, as depicted with respect to stage 310B. On the other hand, after the occurrence of an early TOD event 211B, data may be written only to the vertically lower image forming module, corresponding to second pixel data 360B. An example of this is depicted as stage 310F.

FIG. 5 shows memory module 310 in various stages depicted by 310A, 310B, 310C, 310D, and 310E when relative position signal 340 is set, corresponding to a late TOD event 211A. As also shown in FIG. 5, stages 310A, 310F, 310G, 310H, and 310I depict memory module 310 when relative position signal 340 is not set, corresponding to an early TOD event 211B.

As shown in FIG. 5, input pixel data 350 may be stored in memory units 380A, 380B, 380C, 380D, 380E, and 380F. In some embodiments, pixel data 350 stored in memory units 380A, 380B, 380C, 380D, 380E, and 380F may correspond to distinct individual lines of pixel data. For example, as depicted in stage 310A, a first line of pixel data may be stored in memory units 380A and 380B, a second line of pixel data may be stored in memory units 380C and 380D, and a third line of pixel data may be stored in memory units 380E and 380F.

Exemplary memory module stage 310A may correspond to a first stage of memory module 310 and shows memory units 380A, 380B, 380C, 380D, 380E, and 380F filled with pixel data 350, as indicated by the shaded areas. In FIG. 5, memory module stage 310B, which may correspond to a second stage of memory module 310 after a late TOD event 211A has occurred, shows the first halves of the first two lines of stored data 380A and 380C being sent out as pixel data 360A and 360B, respectively. Memory module stage 310C, which may correspond to a third stage of memory module 310, shows second halves of the first two lines of stored data 380B and 380D being sent out as pixel data 360A and 360B. Note that, as shown in stage 310C, memory units 380A and 380C can be reused in order to store a subsequent line of incoming pixel data 350, while units 380B and 380D are being drained.

Memory module stage 310D shows memory unit 380E and refilled memory unit 380A being drained of the first halves of the next two lines of data while memory units 380B and 380D are being refilled with incoming pixel data. Next, memory module stage 310E shows memory unit 380F and refilled memory unit 380C being drained with the second halves of the next two lines of data while memory units 380A and 380E are being refilled with incoming pixel data.

As noted above, in FIG. 5, stages 310A, 310F, 310G, 310H, and 310I depict stages of memory module 310 when relative position signal 340 is set, corresponding to an early TOD event 211B. As before memory module stage 310A may correspond to a first stage in which memory units 380A, 380B, 380C, 380D, 380E, and 380F may be filled with pixel data 350.

In memory module stage 310F, which may correspond to a second stage of memory module 310, the first half of a first line of pixel data stored in memory unit 380A may be sent out as second pixel data 360B. Memory module 310G may correspond to a third stage of memory module 310 in which the second half of a first line of pixel data 350 stored in memory unit 380B may be sent out as second pixel data 360B, while memory unit 380A may be used concurrently to store the next line of incoming pixel data 350.

As shown in FIG. 5, memory module stage 310H, which may correspond to a fourth stage of memory module 310, the first halves of pixel data stored in memory units 380C and 380E are being output as pixel data 360A and 360B, respectively, while memory unit 380B is being concurrently refilled. Next, memory module stage 310I may correspond to a subsequent stage of memory module 310 where the second halves of pixel data stored in memory units 380D and 380F are being output as pixel data 360A and 360B, respectively, while memory units 380C and 380E are being concurrently refilled.

In some embodiments, the movement of data to and from memory units 380A, 380B, 380C, 380D, 380E, and 380F in memory module 310A may occur under the control of memory control module 320 and memory units, once drained of pixel data, may be dynamically reassigned to subsequent incoming lines of pixel data.

In some embodiments, as exemplified below with respect to FIG. 8, there may be more than two output pixel data 360A and 360B, and, as such, relative position signal 340 may comprise more than a binary signal. In some embodiments, there may be N output pixel data 360A, 360B, 360C, etc. and relative position signal 340 may distinguish N levels. For example, if there are four output pixel data 360A, 360B, 360C, and 360D and the relative position signal may be set to zero, one, two, or three. In some embodiments, one, two, three, or more (up to N) lines of pixel data 360A, 360B, 360C, etc may be written in the first stage of memory module 310 based on relative position signal 340. This may allow pixel data 360A, 360B, 360C, etc. to be printed such that it may be aligned within one printed line of the desired distance to the top of the page or within one printed line of the other components of a printed image, according to some embodiments of the present invention.

Stages 310A, 310B, 310C, 310D, 310E, 310F, 310G, 310H, and 310I of memory module 310 depicted in FIG. 5 exemplify how memory units may be reassigned to output lines of pixel data 360A and 360B, according to some embodiments of the present invention. Other embodiments and examples of how to use and reassign such memory units 380A, 380B, 380C, 380D, 380E, and 380F are described herein. Other embodiments not disclosed herein could be made based on this description to one having skill in the art and would not deviate from scope of the claimed invention.

As depicted in the exemplary memory unit pattern diagram of FIG. 6, in some embodiments, the pattern in which memory units 380A, 380B, 380C, 380D, 380E, and 380F are assigned to pixel data 360A or 360B may repeat. For example, in FIG. 6, the pattern of how memory units 380A, 380B, 380C, 380D, 380E, and 380F are assigned to pixel data 360A and 360B repeats after twelve lines of pixel data have been stored. In some embodiments, the repeating pattern may allow memory modules to be reused in a manner that leaves no memory unit 380A, 380B, 380C, 380D, 380E, and 380F unused at any particular time.

FIG. 7 shows a block diagram depicting exemplary stages 310A, 310B, 310C, 310D, 310E, 310F, 310G, and 310H of memory module 310. As shown in FIG. 7, memory module 310 may comprise twelve memory units 380A, 380B, 380C, 380D, 380E, 380F, 380G, 380H, 380I, 380J, 380K, and 380L. As shown in FIG. 7, five memory units may be used to store each line of pixel data 350 and stages 310A, 310B, 310C, 310D, 310E, 310F, 310G, and 310H of memory module 310 illustrate how the various memory units 380A, 380B, 380C, 380D, 380E, 380F, 380G, 380H, 380I, 380J, 380K, and 380L may be reused while memory module 310 is being concurrently used to write out pixel data 360A and 360B. Stages 310A, 310B, 310C, 310D, 310E, 310F, 310G, and 310H of memory module 310 depicted in FIG. 7 also exemplify how memory units 380A, 380B, 380C, 380D, 380E, 380F, 380G, 380H, 380I, 380J, 380K, and 380L may be reassigned to output lines of pixel data 360A and 360B. In some embodiments, stages 310A, 310B, 310C, 310D, 310E, 310F, 310G, and 310H of memory module 310 may be used when the relative position signal 340 is not set, corresponding to a late TOD event 211A. In some embodiments, other configurations of memory modules 310 and stages of memory modules 310 using memory units 380A, 380B, 380C, 380D, 380E, 380F, 380G, 380H, 380I, 380J, 380K, and/or 380L may be used.

As shown in FIG. 7, memory modules 310A, 310B, 310C, 310D, 310E, 310F, 310G, and 310H may represent a single memory module 310 at different times and in different configurations. For example, memory module 310A may correspond to a first stage of memory module 310 in which memory units 380A, 380B, 380C, 380D, 380E, 380F, 380G, 380H, 380I, 380J, 380K, and 380L may be filled with pixel data 350. Memory module 310B may correspond to a second stage of memory module 310, where relative position signal 340 is not set, when the first portions of the first two lines of pixel data 350, stored in memory units 380A and 380F, may be sent out as pixel data 360A and 360B, respectively. Subsequent stages 310C, 310D, 310E, 310F, 310G, and 310H depicted in FIG. 7 may correspond to exemplary stages in which subsequent portions of pixel data stored in memory units 380A, 380B, 380C, 380D, 380E, 380F, 380G, 380H, 380I, 380J, 380K, and 380L are written out as pixel data 360A and 360B. After data in each of memory units 380A, 380B, 380C, 380D, 380E, 380F, 380G, 380H, 380I, 380J, 380K, and 380L are written out, that memory module may be dynamically reassigned to a subsequent line of pixel data 360A or 360B.

For example, memory module 310H may correspond to a eighth stage of memory module 310 in which a portion of each of two subsequent lines of pixel data 350, stored in memory units 380L and 380C, may be sent out as pixel data 360A and 360B, respectively, and memory units 380K and 380G may be dynamically reassigned and reused in order to store a portion of a next line of incoming pixel data 350.

In some embodiments, the ninth stage of memory module 310 may correspond to memory module 310D, where the memory units may be mapped as follows:

| In memory module 310H | In memory module 310D as the ninth stage |
|---|---|
| 380A | 380C |
| 380B | 380E |
| 380C | 380G |
| 380D | 380I |
| 380E | 380K |
| 380F | 380D |
| 380G | 380F |
| 380H | 380H |
| 380I | 380J |
| 380J | 380L |
| 380K | 380A |
| 380L | 380B |

In some embodiments, memory module 310E will correspond to the tenth stage of memory module 310; memory module 310F will correspond to the eleventh stage of memory module 310; and subsequent stages of memory module 310 will correspond to subsequent memory modules 310D, 310E, 310F, 310G, and/or 310H as appropriate. In some embodiments, pixel data 350 may be stored in memory modules 310A, 310B, 310C, 310D, 310E, 310F, 310G, and/or 310H and may subsequently be written out as pixel data 360A and 360B as described above until an entire image has been written out.

In some embodiments, other configurations of memory units and pixel data in memory module stages 310A, 310B, 310C, 310D, 310E, 310F, 310G, and 310H may be used.

In some embodiments, when relative position signal 340 is set, corresponding to an early TOD event 211B, data in fewer than all of memory units 380A, 380B, 380C, 380D, 380E, 380F, 380G, 380H, 380I, 380J, 380K, and/or 380L corresponding to fewer than all of lines of pixel data 350 may be written out as second pixel data 360B in the first stage of memory modules 310. In some embodiments, once fewer than all of the lines of pixel data 350 are written out as second pixel data 360B, the stages of memory modules 310 may cycle so that similar stages of memory modules 310 will result after each occurrence of a particular stage of memory module 310.

Figure 8:
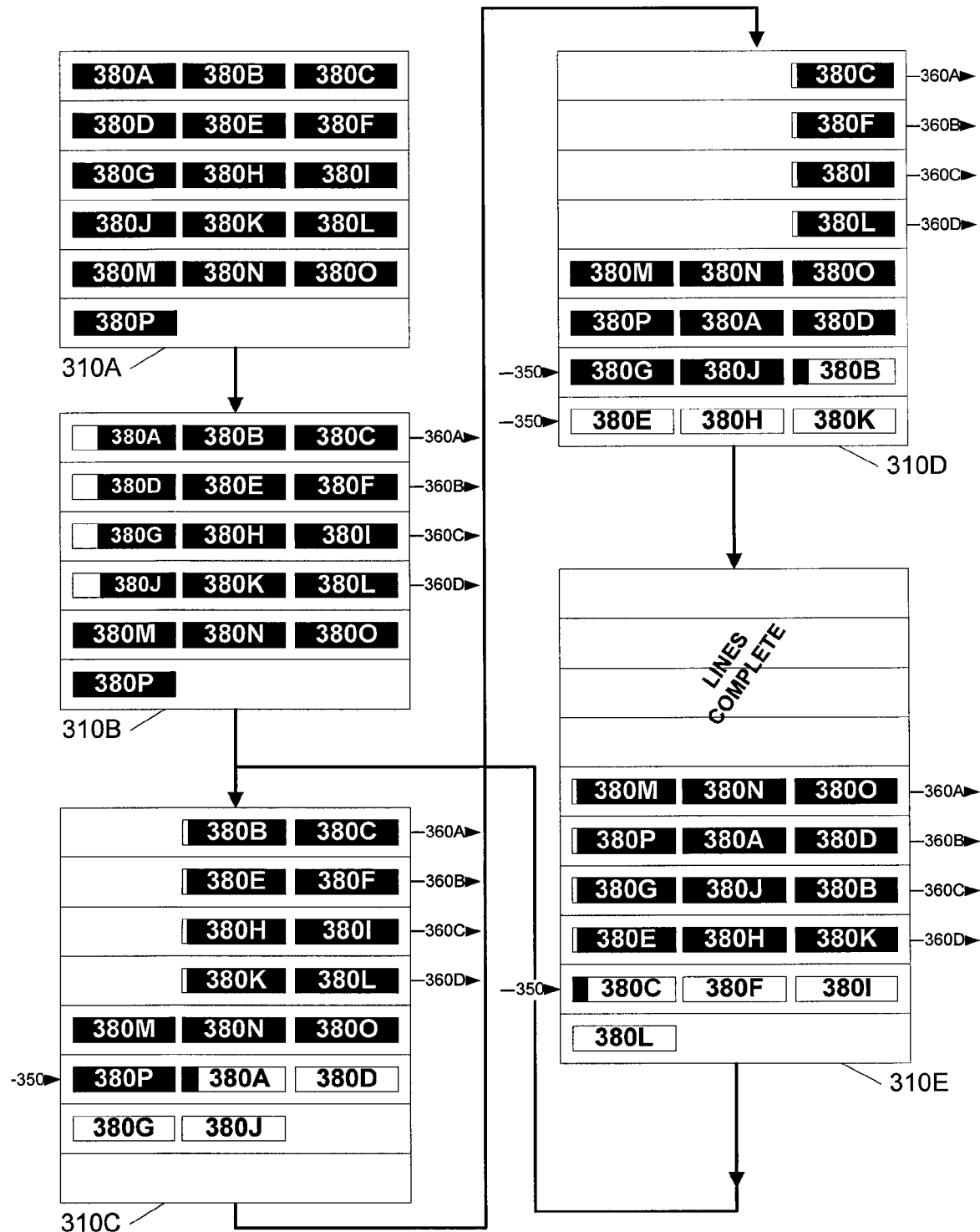
FIG. 8 shows a block diagram depicting exemplary stages of a memory module that uses three memory units per line of pixel data and outputs four lines of pixel data.

FIG. 8 shows a block diagram depicting exemplary stages 310A, 310B, 310C, 310D, and 310E of memory module 310. As shown in FIG. 8, memory module 310 may comprise memory units 380A, 380B, 380C, 380D, 380E, 380F, 380G, 380H, 380I, 380J, 380K, 380L, 380M, 380N, 380O, and/or 380P. In some embodiments, four lines of pixel data 360A, 360B, 360C, and 360D may be written out simultaneously from memory module 310. Each line of pixel data 360A, 360B, 360C, and 360D may correspond to an image forming module. In some embodiments, three memory units may be used to store each line of input pixel data 350. Stages 310A, 310B, 310C, 310D, and 310E of memory module 310 depicted in FIG. 8 exemplify how memory units may be reassigned to output lines of pixel data 360A, 360B, 360C, and 360D according to some embodiments of the present invention.

As shown in FIG. 8, memory modules stages 310A, 310B, 310C, 310D, and 310E may correspond to memory module 310 in various stages when relative position signal 340 is not set, corresponding to a late TOD event 211A. For example, as shown in FIG. 8, memory module stage 310A may correspond to a first stage of memory module 310 in which memory units 380A, 380B, 380C, 380D, 380E, 380F, 380G, 380H, 380I, 380J, 380K, 380L, 380M, 380N, 380O, and 380P may be filled with pixel data 350.

As shown in FIG. 8, memory module stage 310B may correspond to a second stage of memory module 310, when the first portions of the first four lines of pixel data 350, stored in memory units 380A, 380D, 380G, and 380J, may be sent out as pixel data 360A, 360B, 360C, and 360D, respectively. Subsequent stages 310C, 310D, and 310E depicted in FIG. 8 may correspond to exemplary stages in which subsequent portions of pixel data stored in memory units 380A, 380B, 380C, 380D, 380E, 380F, 380G, 380H, 380I, 380J, 380K, 380L, 380M, 380N, 380O, and 380P are written out as pixel data 360A, 360B, 360C, and 360D. After data in each of memory units are written out, that memory module may be dynamically reassigned to a subsequent line of pixel data 360A, 360B, 360C, or 360D.

For example, memory module 310E may correspond to a fifth stage of memory module 310 in which a first portion of the four lines of pixel data 350, stored in memory units 380M and 380P and refilled memory units 380G and 380E, may be sent out as pixel data 360A, 360B, 360C, and 360D, respectively, and memory units 380C, 380F, 380I, and 380L may be reused to store portions of incoming lines of pixel data 350.

In some embodiments, a sixth stage of memory module 310 may correspond to memory module 310C, where the memory units may be mapped as follows:

| In memory module 310E | In memory module 310C as the sixth stage |
| --- | --- |
| 380A | 380E |
| 380B | 380I |
| 380C | 380M |
| 380D | 380F |
| 380E | 380J |
| 380F | 380N |
| 380G | 380G |
| 380H | 380K |
| 380I | 380O |
| 380J | 380H |
| 380K | 380L |
| 380L | 380P |
| 380M | 380A |
| 380N | 380B |
| 380O | 380C |
| 380P | 380D |

In some embodiments, memory module 310D may correspond to a seventh stage of memory module 310; memory module 310E may correspond to an eighth stage of memory module 310; and subsequent stages of memory module 310 may correspond to subsequent memory modules 310C, 310D, and/or 310E as appropriate. In some embodiments, pixel data 350 may be stored in memory units 380A, 380B, 380C, 380D, 380E, 380F, 380G, 380H, 380I, 380J, 380K, 380L, 380M, 380N, 380O, and/or 380P and may subsequently be written out as pixel data 360A, 360B, 360C, and 360D as described above until an entire image has been written out.

In some embodiments, other configurations of memory module 310 or stages of memory module 310 which may comprise memory units 380A, 380B, 380C, 380D, 380E, 380F, 380G, 380H, 380I, 380J, 380K, 380L, 380M, 380N, 380O, and/or 380P may be used. In some embodiments, for example, after the occurrence of an early TOD event 211B, data in fewer than all of memory units 380A, 380B, 380C, 380D, 380E, 380F, 380G, 380H, 380I, 380J, 380K, 380L, 380M, 380N, 380O, and/or 380P corresponding to fewer than all lines of pixel data 350 may be written out as pixel data 360A, 360B, 360C, and/or 360D in the first stage of memory modules 310. Once fewer than all of the lines of pixel data 350 are written out as pixel data 360A, 360B, 360C, and 360D, the stages of memory modules 310 may cycle so that similar stages of memory modules 310 will result after each occurrence of a particular stage of memory module 310.

Figure 9:
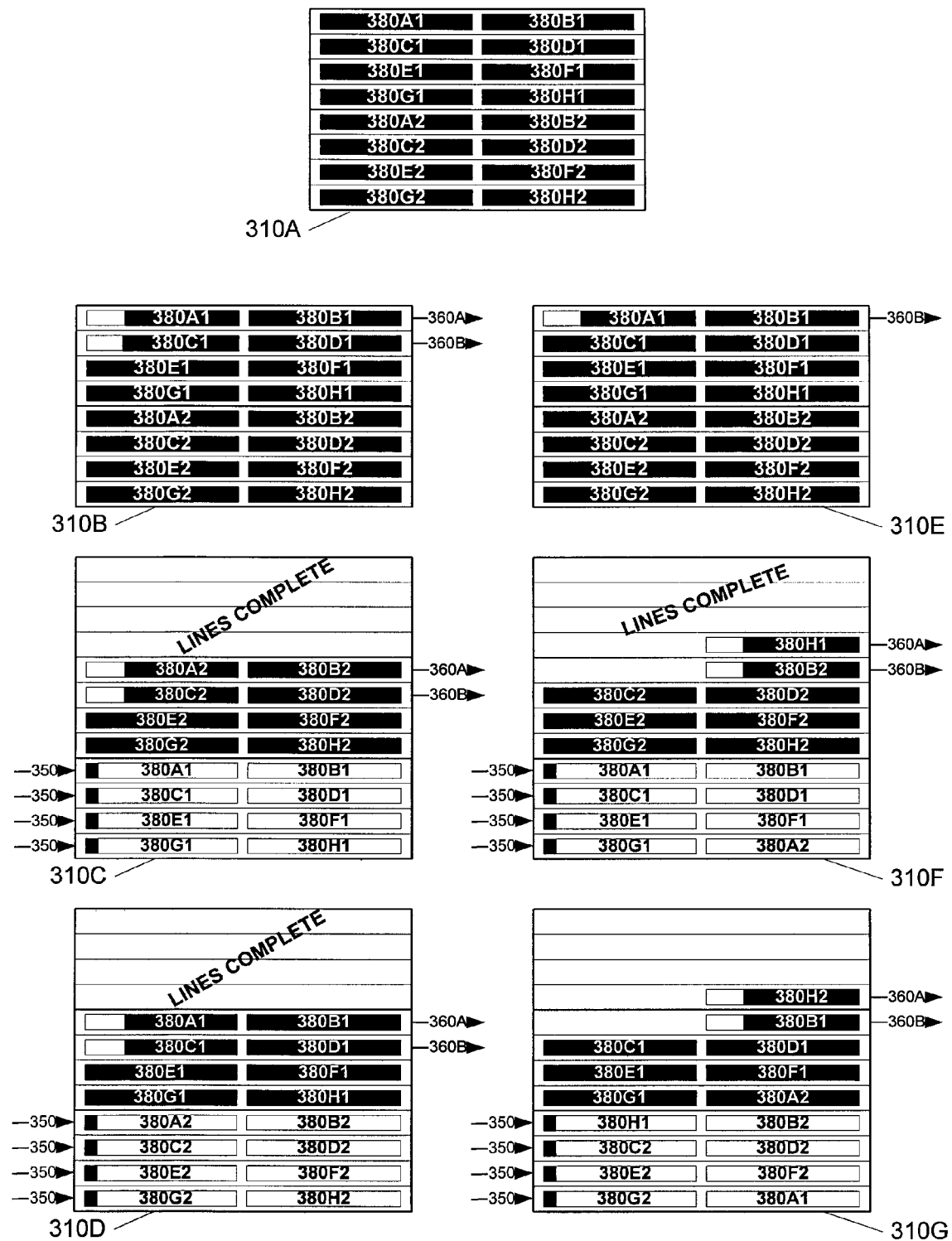
FIG. 9 shows a block diagram depicting exemplary stages of a memory module that uses two memory units per line of pixel data; outputs two lines of pixel data; and takes in four lines of pixel data.

FIG. 9 shows a block diagram depicting exemplary stages 310A, 310B, 310C, 310D, 310E, 310F, and 310G of memory module 310. As shown in FIG. 9, memory module 310 may comprise memory units 380A1, 380B1, 380C1, 380D1, 380E1, 380F1, 380G1, 380H1, 380A2, 380B2, 380C2, 380D2, 380E2, 380F2, 380G2, and/or 380H2. As shown in FIG. 9, two memory units 380A1, 380B1, 380C1, 380D1, 380E1, 380F1, 380G1, 380H1, 380A2, 380B2, 380C2, 380D2, 380E2, 380F2, 380G2, and/or 380H2 may be used to store each line of pixel data 350. In some embodiments, two lines of pixel data 360A and 360B may be written out from memory module 310 and there may be two image forming modules or submodules in printer 100 corresponding to each output pixel data 360A and 360B. As shown in FIG. 9, memory module 310 may take in four lines of pixel data 350 or a block of pixel data 350 comprising four lines of pixel data 350. In some embodiments, decompressor module 106 may decompress and send pixel data 350 as a block of data comprising multiple lines of pixel data 350. In some embodiments, decompressor module 106 may send a block of four lines of pixel data 350 to memory module 310. Stages 310A, 310B, 310C, 310D, 310E, 310F, and 310G of memory module 310 depicted in FIG. 9 exemplify how memory units may be reassigned to output lines of pixel data 360A and 360B according to some embodiments of the present invention. Since, in some embodiments, four lines of pixel data are read in simultaneously, use of memory units corresponding to eight lines of pixel data 350 may avoid video underrun by allowing four lines of data to be read in while simultaneously writing out stored pixel data as pixel data 360A and 360B.

As shown in FIG. 9, memory modules 310A, 310B, 310C, 310D, 310E, 310F, and 310G may represent memory module 310 at different times and in different configurations. As shown in FIG. 9, memory modules 310A, 310E, 310F, and 310G may correspond to memory module 310A in various stages when relative position signal 340 is set, corresponding to early TOD event 211B. As shown in FIG. 9, memory modules 310A, 310B, 310C, and 310D may correspond to memory module 310A in various stages when relative position signal 340 is not set. Memory module 310A may correspond to a first stage of memory module 310 in which memory units 380A1, 380B1, 380C1, 380D1, 380E1, 380F1, 380G1, 380H1, 380A2, 380B2, 380C2, 380D2, 380E2, 380F2, 380G2, and 380H2 may be filled with pixel data 350.

As shown in FIG. 9, memory module 310B may correspond to a second stage of memory module 310, where relative position signal 340 is not set, in which the first portions of the first two lines of pixel data 350, stored in memory units 380A1 and 380C1, may be sent out as pixel data 360A and 360B, respectively. As shown in FIG. 9, once pixel data 350 stored in memory units 380A1 and 380C1 may be written out as pixel data 360A and 360B, respectively; pixel data 350 stored in memory units 380B1 and 380D1 may be written out as pixel data 360A and 360B, respectively; and finally pixel data 350 stored in memory units 380F1 and 380H1 may be written out as pixel data 360A and 360B, respectively.

As shown in FIG. 9 with respect to stage 310C of memory module 310, once pixel data for the first four lines of pixel data 350 have been written out as pixel data 360A and 360B, memory units 380A1, 380B1, 380C1, 380D1, 380E1, 380F1, 380G1, and 380H1 may be dynamically reassigned to store pixel data 350 corresponding to the next four lines of pixel data 350 may be stored therein.

In some embodiments, pixel data 350 stored in memory units 380A2, 380B2, 380C2, 380D2, 380E2, 380F2, 380G2, and 380H2 may be written out as pixel data 360A and 360B. Pixel data 350 stored in memory units 380A2 and 380C2 may be written out as pixel data 360A and 360B, respectively, followed by pixel data 350 stored in memory units 380B2 and 380D2 being written out as pixel data 360A and 360B, respectively; pixel data 350 stored in memory units 380E2 and 380G2 being written out as pixel data 360A and 360B, respectively; and pixel data 350 stored in memory units 380F2 and 380H2 being written out as pixel data 360A and 360B, respectively.

As shown in FIG. 9 with respect to stage 310D of memory module 310, once pixel data for the four lines of pixel data 350 have been written out as pixel data 360A and 360B, memory units 380A2, 380B2, 380C2, 380D2, 380E2, 380F2, 380G2, and 380H2 may be reused and the next four lines of pixel data 350 may be stored therein. Further, the first portions of the subsequent lines of pixel data 350, stored in memory units 380A1 and 380C1, may be sent out as pixel data 360A and 360B, respectively.

As shown in FIG. 9, when relative position signal 340 is set, memory module 310E may represent a second stage of memory module 310, after the first stage 310A of memory module 310, where pixel data 350 stored in memory unit 380A1 may be written out as second pixel data 360B. Pixel data 350 stored in memory unit 380B1 may be written out as second pixel data 360B; pixel data 350 stored in memory units 380C1 and 380D1 and pixel data 350 stored in memory units 380E1 and 380F1 may be written out as pixel data 360A and 360B, respectively.

As shown in FIG. 9 with respect to stage 310F of memory module 310, once pixel data 350 stored in memory units 380A1, 380B1, 380C1, 380D1, 380E1, 380F1, 380G1, and 380A2 have been written out as pixel data 360A and 360B, memory units 380A1, 380B1, 380C1, 380D1, 380E1, 380F1, 380G1, and 380A2 may be dynamically reassigned to store subsequent lines of pixel data 350. As shown in FIG. 9 with respect to stage 310G of memory module 310, once pixel data 350 stored in memory units 380H1, 380B2, 380C2, 380D2, 380E2, 380F2, 380G2, and 380A1 have been written out as pixel data 360A and 360B, memory units 380H1, 380B2, 380C2, 380D2, 380E2, 380F2, 380G2, and 380A1 may be reused and subsequent lines of pixel data 350 may be stored therein.

In some embodiments, each stage 310A, 310B, 310C, 310D, 310E, 310F, and 310G of memory module 310 may be followed by another stage 310A, 310B, 310C, 310D, 310E, 310F, or 310G of memory module 310 and there may be a pattern of which stages 310A, 310B, 310C, 310D, 310E, 310F, or 310G of memory module 310 follow which other stages of memory module 310. Furthermore, other stages of memory module 310, in addition to those depicted in FIG. 9, may be used and may form part of a pattern of repeating stages of memory module 310 that may be used to write out a complete image.

As exemplified in FIGS. 5, 7, 8, and 9, memory modules 310 may comprise two or more memory units 380. In some embodiments, such as that described with respect to FIG. 5, two memory units 380A, 380B, 380C, 380D, 380E, or 380F may be used per line of pixel data 350 and a total of six memory units 380A, 380B, 380C, 380D, 380E, and 380F may be capable of storing three lines of pixel data 350. In some embodiments, the use of six memory units 380 may be useful for avoiding video underrun where memory units 380 may be filled and drained simultaneously.

In some embodiments, one may reduce the total amount of memory used by memory module 310 by increasing the number of memory units 380 used to store each line of pixel data 350, thereby decreasing the size of each memory unit 380. For example, let (A) be the number of lines of output pixel data 360; (B) be number of memory units 380 used to store a line of pixel data 350; (C) be number of lines of pixel data 350 stored; and (D) number of memory units 380 per memory module 310, where D=B*C. In some embodiments, (C)=(A+A/B), where memory units 380 may store (1/B) lines of pixel data 350. In some embodiments, the number of memory units 380 used may be: D=(B*C)=(B*(A+A/B)). For example, as depicted in FIG. 5, (A), the number of lines of pixel data 360A and 360B written out was two; (B), the number of memory units 380 per line was two; and the number of memory units 380 per memory module 310 was (2*(2+2/2))=6. This may correspond to using memory units 380 to store a total of three lines of pixel data 350. In some embodiments, if pixel data 350 were written to memory units 380 faster than pixel data 360A, 360B is written from memory units 380, then fewer than the described number of memory units 380 may be used while still avoiding video underrun.

In some embodiments, by increasing the number of memory units 380 per line of pixel data 350, one may reduce the amount of memory used. In some embodiments, such as that depicted in FIG. 7, there may be two output lines of pixel data 360A and 360B and five memory units 380 per line of pixel data 350. In some embodiments, such as that depicted in FIG. 7, the number (A) of output lines of pixel data 360A and 360B may be two and the number (B) of memory units 380 per line of pixel data 350 may be five, therefore twelve memory units may be used: (5*(2+2/5))=12 memory units.

In some embodiments, twelve memory units 380 used with respect to the example in FIG. 7 may represent less overall memory than used with respect to the example in FIG. 5. The total memory used may be measured as the total amount of pixel data 350 that may be to be stored at any one time. In some embodiments, such as that depicted with respect to FIG. 5, six memory units 380 may have been used, which may correspond to three lines of pixel data 350, whereas, with respect to the example of FIG. 7, twelve memory units 380 may be used, but these may be equivalent to 12/5 or 2.4 lines of pixel data 350. Therefore, according to some embodiments of the present invention, less total memory may be used for the example with respect to FIG. 7 than for the example of FIG. 5.

Other configurations and memory needs may be possible. As depicted in FIG. 8, for example, a memory module 310 may be used to write out four lines of pixel data 360A, 360B, 360C, and 360D and three memory units 380 may be needed to store each line of pixel data 350. In some embodiments, this may result in using storage for (4+4/3=5⅓) lines of pixel data 350 or, equivalently, sixteen memory units 380.

In some embodiments, such as that depicted with respect to FIG. 9, when pixel data 350 is received in blocks and the blocks comprise multiple lines of pixel data 350, the useful total memory size may be two complete blocks corresponding to two times the number of lines of pixel data 350 in each block of pixel data 350. In some embodiments, for example, as depicted in FIG. 9, block of pixel data 350 corresponds to four lines of pixel data 350; and the number of memory units 380 used may correspond to the number of memory units 380 useful for holding eight lines of pixel data 350. In some embodiments, if there are four lines per block of pixel data 350 and two memory units 380 per line of pixel data 350, then one may use sixteen memory units 380 in order to store pixel data 350 and output pixel data 360A and 360B.

Alternatively, (not depicted) (X) columns of memory units 380 may be used to store incoming lines of pixel data if the decompressor module 106 decompresses lines from left to right in sequential blocks of a size that will fit into (X) columns of memory units 380 from left to right. In such cases, the number of memory units 380 needed may be based on the number of lines of pixels data in a decompressed data block (L), the number of columns of memory units needed to store one data block (X), and the number of memory units per line (M). (X) may be less than (M). The total number of memory units needed may be (L*M)+(L*X). For example, if the decompressor module 106 decompressed a ten-pixel column of data at a time, then the total number of memory units that would be needed may be (L*M)+(L*1) (M=1 if ten pixels will fit into a single memory unit).

Whereas, according to some embodiments of the present invention, increasing the number of memory units 380 per line of pixel data may reduce the overall memory requirements, there may be limits imposed by memory architecture. For example, if memory units 380 may be implemented in sizes of powers of two, then certain numbers of memory units 380 per line of pixel data may more efficiently use the memory in memory module 310. For example, consider an embodiment in which there are 20,400 pixels per line of pixel data 350 and there are two lines of output pixel data 360A and 360B. The amount of memory required may be summarized as follows:

| Number of memory units/line | Minimum memory unit 380 size | Implemented memory unit 380 size (2^N) | Total memory units 380 | Total memory unit 380 space |
|---|---|---|---|---|
| 2 | 10200 | 16384 | 6 | 98304 |
| 3 | 6800 | 8192 | 8 | 65536 |
| 4 | 5100 | 8192 | 10 | 81920 |
| 5 | 4080 | 4096 | 12 | 49152 |
| 6 | 3400 | 4096 | 14 | 57344 |
| 7 | 2915 | 4096 | 16 | 65536 |

In this example, four memory units 380 per line of pixel data 350 may use more space than would an implementation that uses three memory units 380 per line of pixel data 350 because a large part of each implemented memory unit 380 may go unused. In some embodiments, for the example, five memory units 380 per line of pixel data 350 may be useful because the actual, implemented memory unit 380 size may be similar to and just larger than the minimum memory unit size. As such, in some embodiments, where there are constraints on the sizes of memory units 380, there may be particular numbers of memory units 380 per line of pixel data 350 that would result in less memory being used overall.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An image forming apparatus comprising:
a plurality of image forming modules coupled to:
a data control module comprising:
a plurality of memory units, wherein each memory unit can store a portion of an image; and
wherein the data control module:
receives a first signal and a second signal; and
selects at least one of the plurality of image forming modules to send the image portions stored in the plurality of memory units based on a timing relationship between a first image alignment event on the first signal and a second image alignment event on the second signal, wherein the timing relationship is evaluated by comparing a time difference between the first image alignment event and the second image alignment event to a threshold.

2. The apparatus of claim 1, wherein the timing relationship correlates image forming modules with image portions so that image portions are written out by corresponding image forming modules.

3. The apparatus of claim 1, wherein a set of memory units stores contiguous portions of a line of image pixel data, and successive sets of memory units store successive lines of image pixel data.

4. The apparatus of claim 1, wherein one or more memory units of the plurality of memory units are used to store the top-most line of pixel data in the image.

5. The apparatus of claim 1, wherein the first signal is a vertical synchronization signal and the first image alignment event is a top of data event or top of page event.

6. The apparatus of claim 1, wherein the second signal is a horizontal synchronization signal and the second image alignment event is a horizontal synchronization event or beam detect event.

7. The apparatus of claim 1, wherein the first image alignment event is a top of data event and the second image alignment event is a beam detect event.

8. The apparatus of claim 1, wherein the threshold corresponds to a fraction of the time interval between two successive occurrences of the second image alignment event on the second signal.

9. The apparatus of claim 8, wherein the fraction is defined as one divided by the number of image forming modules used in the plurality of image forming modules.

10. The apparatus of claim 8, wherein the second image alignment event is a beam detect event and the threshold corresponds to a fraction of the cycle between beam detect events.

11. The apparatus of claim 8, wherein the image forming modules simultaneously write successive lines of pixel data to a printed image.

12. The apparatus of claim 11, wherein a first image forming module writes an uppermost line of pixel data; and each subsequent image forming module writes a subsequent line of pixel data.

13. The apparatus of claim 11, wherein the data control module sends the pixel data corresponding to the topmost line of pixel data to an (A+1−N)th image forming module in response to a first image alignment event that occurs during an (N)th subinterval of (A) subintervals of time interval (T), where
A is the number of image forming modules, and
T is the time interval between two occurrences of the second image alignment event.

14. The apparatus of claim 1, wherein
the data control module dynamically associates two or more memory units of the plurality of memory units with each line of pixel data, and
each memory unit associated with a line of pixel data stores a portion of the line of pixel data.

15. The apparatus of claim 14, wherein
the data control module writes out a first portion of the first line of pixel data from a particular memory unit of the two or more memory units to the chosen image forming module; and
after the data control module writes out the first portion of the first line of pixel data, the data control module associates the particular memory unit with a different line of pixel data.

16. The apparatus of claim 1, wherein the memory units are first-out (FIFO) memories.

17. The apparatus of claim 1, wherein the number of memory units associated with each line of pixel data is determined based on the physical memory capacity of available memory units.

18. An image forming method comprising:
receiving a first signal and a second signal; and
selecting at least one of a plurality of image forming modules to send a portion of an image stored in a plurality of memory units based on a timing relationship between a first image alignment event on the first signal and a second image alignment event on the second signal,
wherein the plurality of image forming modules are coupled to a data control module, wherein the data control module comprises the plurality of memory units, wherein each memory unit can store a portion of an image, wherein the timing relationship is evaluated by comparing a time difference between the first image alignment event and the second image alignment event to a threshold.

19. The method of claim 18, wherein a set of memory units stores contiguous portions of a line of image pixel data, and successive sets of memory units store successive lines of image pixel data.

20. The method of claim 18, wherein the first signal is a vertical synchronization signal and the first image alignment event is a top of data event or top of page event.

21. The method of claim 18, wherein the second signal is a horizontal synchronization signal and the second image alignment event is a horizontal synchronization event or beam detect event.

22. The method of claim 18, wherein the method further comprises
dynamically associating two or more memory units of the plurality of memory units with each line of pixel data; wherein each memory unit associated with a line of pixel data stores a portion of the line of pixel data.

23. An image forming system comprising:
a plurality of image forming modules coupled to:
a data control module comprising:
a plurality of memory units, wherein each memory unit can store a portion of an image; and
wherein the data control module:
receives a first signal and a second signal; and
selects at least one of the plurality of image forming modules to send the image portions stored in the plurality of memory units based on a timing relationship between a first image alignment event on the first signal and a second image alignment event on the second signal, wherein the timing relationship is evaluated by comparing a time difference between the first image alignment event and the second image alignment event to a threshold.

24. The system of claim 23, wherein a set of memory units stores contiguous portions of a line of image pixel data, and successive sets of memory units store successive lines of image pixel data.

25. The system of claim 23, wherein the first signal is a vertical synchronization signal and the first image alignment event is a top of data event or top of page event.

26. The system of claim 23, wherein the second signal is a horizontal synchronization signal and the second image alignment event is a horizontal synchronization event or beam detect event.

27. The system of claim 23, wherein
the data control module dynamically associates two or more memory units of the plurality of memory units with each line of pixel data, and
each memory unit associated with a line of pixel data stores a portion of the line of pixel data.

* * * * *